United States Patent [19]
Jung et al.

[11] Patent Number: 5,887,040
[45] Date of Patent: Mar. 23, 1999

[54] HIGH SPEED DIGITAL DATA RETIMING APPARATUS

[75] Inventors: Hee-Young Jung; Bhum-Cheol Lee; Kwon-Chul Park, all of Daejeon, Rep. of Korea

[73] Assignees: Electronics and Telecommunications Research Institute, Daejeon; Korea Telecommunication Authority, Seoul, both of Rep. of Korea

[21] Appl. No.: 746,992

[22] Filed: Nov. 19, 1996

[30] Foreign Application Priority Data

Dec. 16, 1995 [KR] Rep. of Korea ............ 95-50868

[51] Int. Cl.⁶ ............................................. H04L 7/00
[52] U.S. Cl. ................................... 375/372; 327/152
[58] Field of Search ............................ 375/371, 372, 375/373, 375, 354; 371/2.1; 327/141, 144, 145, 146, 149, 150, 152, 153, 161, 166

[56] References Cited

U.S. PATENT DOCUMENTS

| | | | |
|---|---|---|---|
| 4,821,296 | 4/1989 | Cordell | 375/119 |
| 5,117,135 | 5/1992 | Lee et al. | 327/7 |
| 5,126,602 | 6/1992 | Lee et al. | 327/10 |
| 5,233,636 | 8/1993 | Lee et al. | 375/373 |
| 5,248,969 | 9/1993 | Lee et al. | 341/73 |
| 5,278,873 | 1/1994 | Lowrey et al. | 375/118 |
| 5,430,772 | 7/1995 | Lee et al. | 375/363 |

OTHER PUBLICATIONS

A 45–Mbit/s CMOS VLSI Digital Phase Aligner; Robert R. Cordell; 1988; pp. 323–328.

*Primary Examiner*—Chi H. Pham
*Assistant Examiner*—William Luther
*Attorney, Agent, or Firm*—Antonelli, Terry, Stout & Kraus, LLP

[57] ABSTRACT

The present invention provides a high speed digital data retiming apparatus, in which, in binary data bits transmitted at a high speed, the data can be retimed in a stable manner, even if there are present a static skew due to a delay difference between the retiming clock pulse and the data and a dynamic skew due to the characteristic variation according to time and temperature. Therefore, the present invention has the following advantages compared with the conventional apparatus. First, periodical and regular external clock pulses are delayed by means of a delaying section, so that system performance is independent of the pattern of data. Second, even if the data phases show a continuous difference (wandering) for more than a certain period of time, an elastic buffer absorbs the wandering, and therefore, no data loss is generated, with the result that the system is not put to a disorder condition. Third, even in the case where a metastable state occurs, its occurrence probability can be significantly reduced by utilizing logic, thereby making it possible to retime the data in stable manner.

1 Claim, 11 Drawing Sheets

HIGH SPEED DIGITAL DATA RETIMING APPARATUS

BACKGROUND OF THE INVENTION

1. Field of the invention

The present invention relates to an apparatus for retiming high speed digital data, in which, in binary data bits transmitted at a high speed, the data can be retimed in a stable manner, even if there are present a static skew due to a delay difference between the retiming clock pulse and the data and a dynamic skew due to the characteristic variation according to time and temperature.

2. Description of the prior art

In the conventional digital system in which data are transmitted at a high speed, there are many cases in which the total system operates in synchronization with system clock pulse. In these cases, if the phases of the data and the clock pulse are not proper (that is, if the edges of the data and the edges of the clock pulse are not separated enough to satisfy the set-up time of a flip flop and a delay time), then a metastability condition occurs, and consequently, the data cannot be retimed in a stable manner.

In an attempt to solve the above described problem, a method for recovering clock pulse based on PLL (phase locked loop) structure has been developed, as can be found in [C. P. Summer (British Patent 8,039,874), M. Belkin (U.S. Pat. No. 4,400,667), and C. R. Hogge (U.S. Pat. No. 4,535,459)]. Based on this method, the data can be retimed in a stable manner during a high speed data transmission. However, its constitution is generally complicated, and there are used analogue components such as a voltage controlled oscillator, a low pass filter and the like. Therefore, it is difficult to achieve a high density, and it is uneconomical.

In an attempt to overcome the above described disadvantages, another method has been proposed. According to this method, external clock pulse having 4 phases (0°, 90°, 180° and 270°) is generated to detect the edge portion of the data. Then, by utilizing this, a control signal is formed to select a delay data suitable for the phases of the external pulse, from among the data having sequential phase delays. In this method, however, since the clock pulse having four phases is used, the generation of the pulses becomes difficult as the frequency becomes high [R. R. Cordell (IEEE journal of solid state circuits, vol 23, No. 2, 1988)].

In order to solve this problem, only clock pulse having phases opposite to the phases of the external clock pulse is used to reduce the number of the clock pulse having different phases. In this case, since clock pulse having inverted phases is used, the timing margin of the system is reduced, and therefore, the overall operating frequency of the system is lowered [R. R. Cordell (U.S. Pat. 4,821,296)]. In order to improve this, clock pulse having a plurality of phases is generated by utilizing a delay device, so that external clock pulse having a single phase may be used [S. W. Lowery (U.S. Pat. No. 5,278,873)].

FIG. 1 illustrates the constitution of the above described conventional binary data retiming apparatus. In this drawing, reference code 101 indicates an edge detector, 102 indicates an increment-decrement controller, and 103 indicates a D/DD register & multiplexer. The edge detector 101 delays the external clock pulse by using a delaying device which has many steps. Thus, external clock pulse having a plurality of phases is generated, and by utilizing these, data edges are detected. The increment-decrement controller 102 utilizes the edge detecting signals of the detected data so as to generate up/down control signals for controlling the D/DD register & multiplexer 103. The D/DD register & multiplexer 103 receives the up/down control signals for selecting data synchronized with the phase of the external clock pulse, the selected data being outputted through a multiplexer.

The above described method has the advantage that the clock pulse having a plurality of phases is not required. That is, it uses clock pulse of a single phase. However, like the methods described before above, the non-periodical random data are delayed by using a delaying device, and therefore, the system performance becomes data-pattern-dependent. Therefore, if the data phases show a continuous difference more than a certain period of time so as to depart (wander) from a predetermined delay limit, then an initialization has to be carried out. Therefore, a data loss is generated, and due to this, the system falls into a fault state.

SUMMARY OF THE INVENTION

The present invention is intended to overcome the above described problems of the conventional techniques.

Therefore it is an object of the present invention to provide an apparatus for retiming high speed digital data, in which periodical and regular external clock pulse is delayed by using a delaying means so as to make the system performance becomes data-pattern-independent, and even if the data phase shows a continuous difference (wander), an elastic buffer can absorb it so as to avoid a data loss and so as to make the system not fall into a fault state, and even if a metastability condition occurs, its overall probability can be significantly reduced.

In achieving the above object, the apparatus for retiming high speed digital data according to the present invention includes: a multi-phase clock pulse generating means for generating n (n being a natural number) multiphase clock pulse having n phases by utilizing externally inputted clock pulse; a retiming clock pulse select signal generating means for receiving the multi-phase clock pulse from the multi-phase clock pulse generating means, so as to generate control signals for selecting one or more of clock pulse with their edges approaching to the center of a unit interval of externally inputted data, from among the n multi-phase clock pulses; a retiming clock pulse synthesizing means for receiving the multi-phase clock pulse from the multi-phase clock pulse generating means and the retiming clock pulse select signals from the retiming clock pulse select signal generating means, to synthesize the retiming clock pulse so as to make edges of the retiming clock pulse formed at a center of the externally inputted data unit interval; and a data retiming means for receiving the synthesized retiming clock pulse from the retiming clock pulse synthesizing means so as to retime the externally inputted data.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

A preferred embodiment of the present invention will be described referring to FIG. 2.

Figure 1:
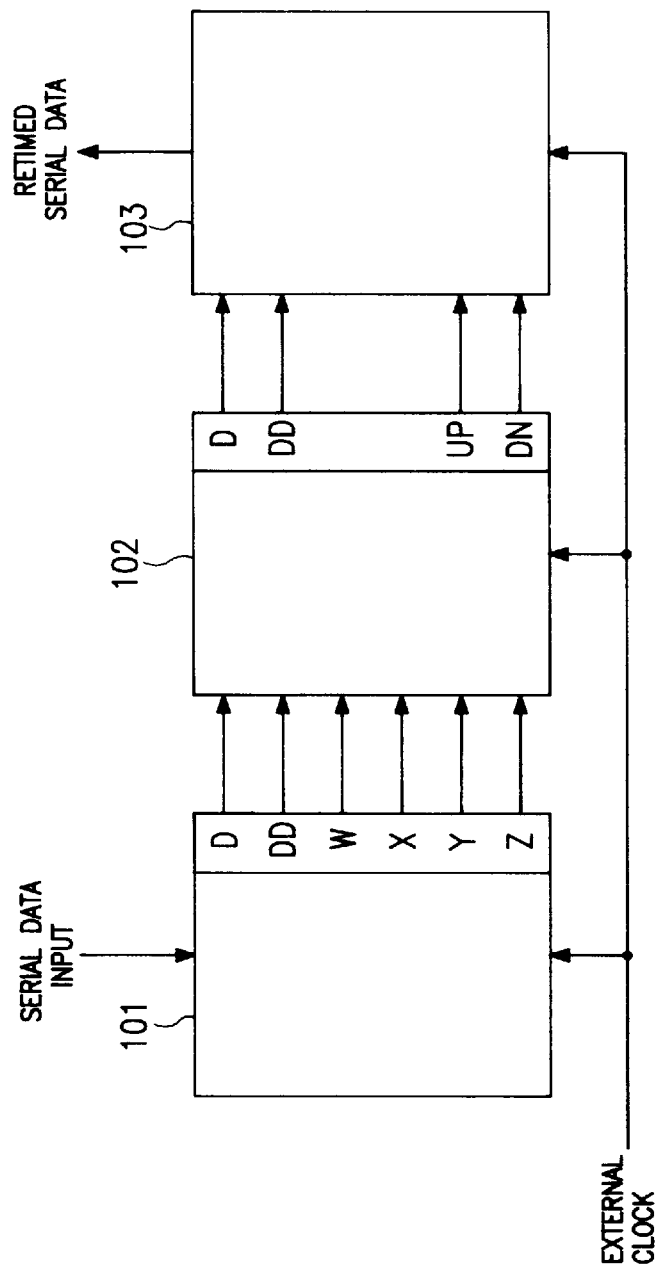
FIG. 1 illustrates the constitution of a conventional apparatus for retiming high speed digital data.
Figure 2:
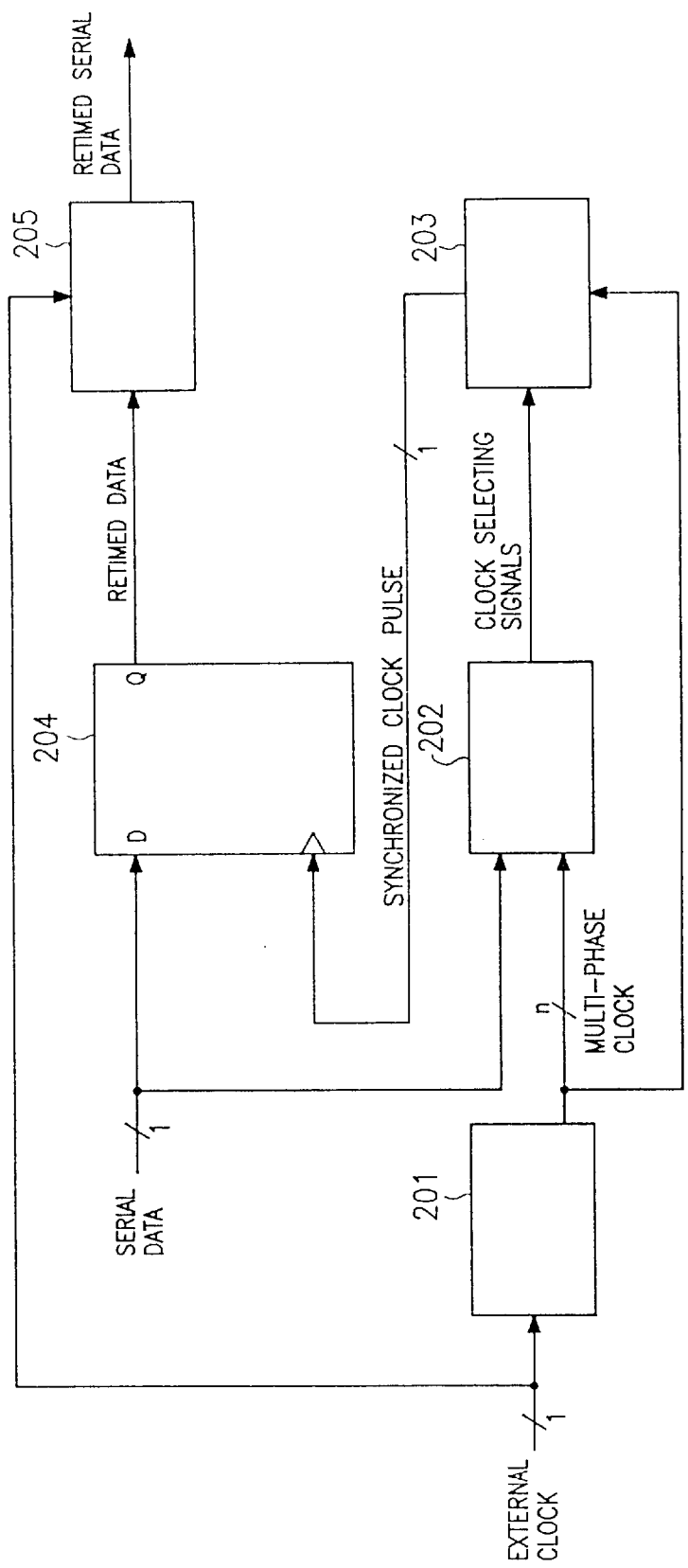
FIG. 2 illustrates the apparatus for retiming high speed digital data according to the present invention.

FIG. 2 illustrates the apparatus for retiming high speed digital data according to the present invention.

Reference code 201 indicates a multi-phase clock pulse generating section, 202 indicates a retiming clock pulse select signal generating section, 203 indicates a retiming clock pulse synthesizing section, 204 indicates a data retiming section, and 205 indicates an elastic buffer.

As shown in the drawing, the multi-phase clock pulse generating section 201 generates n multi-phase clock pulse having n phases by utilizing externally inputted clock pulse. In the n multi-phase clock pulse having n phases, the phase difference between the first clock pulse and the last clock pulse of the multi-phase clock pulse is equal to or larger than a period T of the externally inputted clock pulse (that is, the phase difference P between an arbitrary clock pulse of the multi-phase clock pulse and the immediately preceding clock pulse satisfies a relation $P \geq T/(n-1)$.

The retiming clock pulse select signal generating section 202 receives the multi-phase clock pulse from the multi-phase clock pulse generating section 201. Then the section 202 generates control signals for selecting one or more clock pulse in which edges occur near the center of the data unit interval of the externally inputted data, from among the n multi-phase clock pulse (that is, the edges are such that, if the retiming is done in the rising edge of the clock pulse, it indicates the rising edge, while if the retiming is done in the falling edge, it indicates the falling edge).

The retiming clock pulse synthesizing section 203 receives the multi-phase clock pulse from the multi-phase clock pulse generating section 201 and the retiming clock pulse select signals from the retiming clock pulse select signal generating section 202, and synthesizes them in such a manner that the edges of the retiming clock pulse should occur at the center of the unit interval of the externally inputted data.

The data retiming section 204 retimes the externally inputted data by utilizing the synthesized retiming clock pulse of the retiming clock pulse synthesizing section 203.

When the phase of the externally inputted data is slowly varied (wander) by more than one period to a positive value or to a negative value relative to the externally inputted clock pulse, the elastic buffer section 205 absorbs them, so that a slip would not occur. Then the elastic buffer section 205 outputs the retimed data (retimed by the retiming clock pulse of the retiming clock pulse synthesizing section 203), in such a manner that the finally retimed data (retimed again by the externally inputted clock pulse) should be synchronized with the phase of the externally inputted clock pulse.

Figure 3:
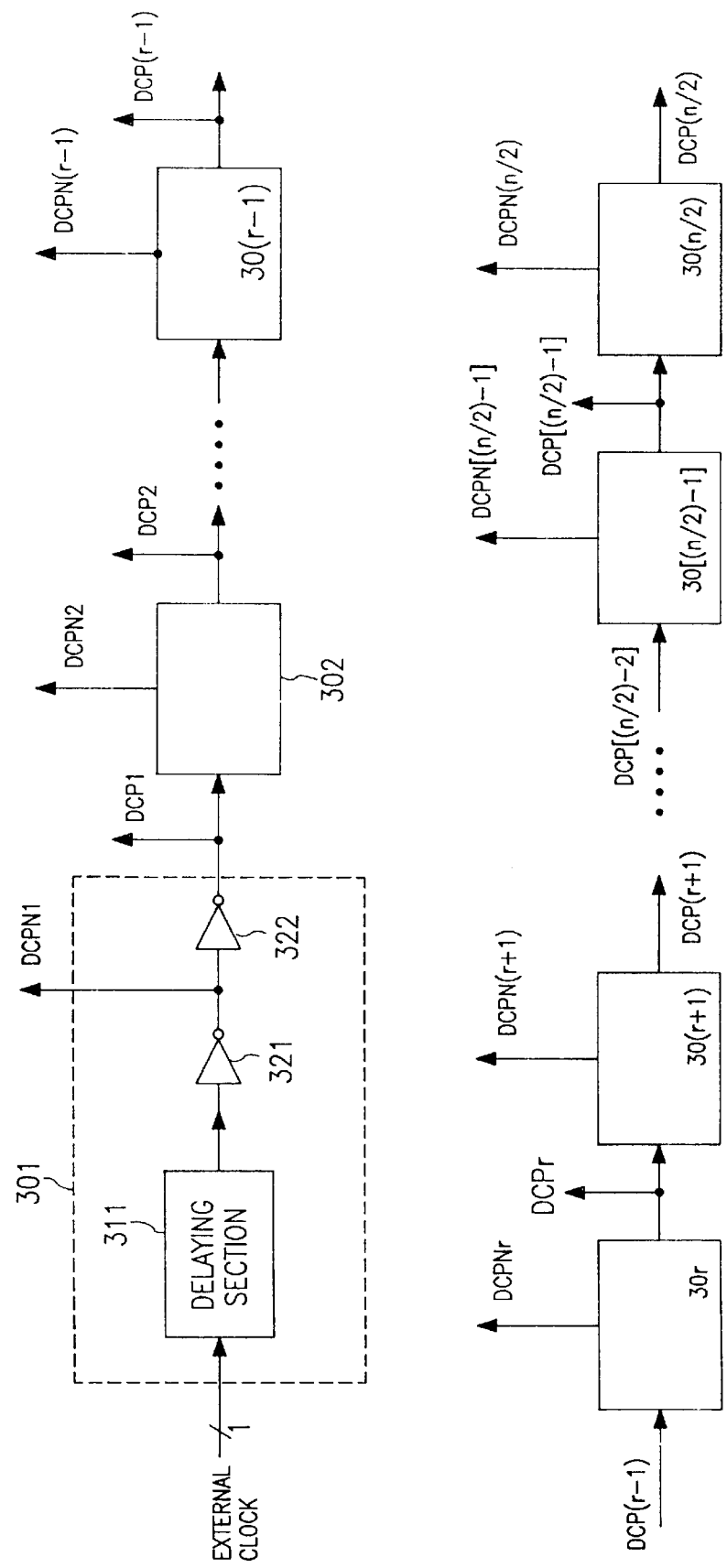
FIG. 3 illustrates an embodiment of the multiphase clock pulse generating section according to the present invention.

FIG. 3 illustrates an embodiment of the multiphase clock pulse generating section according to the present invention. In this drawing, reference codes 301, 302,. . .,30[(n/2)–1], 30(n/2) indicate positive phase clock generating modules for generating one normal phase clock pulse and one inverse phase clock pulse. Further, reference code 311 indicates a delaying device for delaying the input, and reference codes 321 and 322 indicate inverters.

As shown in this drawing, an externally inputted clock is received into the first stage positive clock generating module 301. Then the clock is delayed by the delaying device 311, and then, is formed into one inverse phase clock pulse DCPN1 and one normal phase clock pulse DCP1 by the inverter 321. Then the one normal phase clock pulse DCP1 which has been generated by the positive phase clock generating module 301 is outputted to the positive phase clock generating unit module of the positive clock generating unit module 302.

The positive phase clock generating unit module 302 receives the normal phase clock pulse DCP1 from the positive phase clock generating unit module 301, so as to make the pulse DCP1 delayed by the delaying device. Then through two inverters, there are formed one normal phase clock pulse DCP2 and one inverse phase clock pulse DCPN2. Then, the one normal phase clock pulse thus formed is outputted to the positive phase clock generating unit module of the positive phase clock generating unit module 303. That is, 30r (where r is a natural number smaller than n/2) receives the normal phase clock which has been generated by the preceding stage [i.e., 30(r–1)]. Then the clock is delayed by a delaying device, and then, through two inverters, there are generated one normal phase clock pulse DCPr and one inverse phase clock pulse DCPNr. Then the one normal phase clock pulse DCPr which has been generated by the stage 30r is outputted to the next stage [i.e., 30(r+1)].

The positive phase clock generating module 30(n/2) which is the last stage receives a normal phase clock DCP(n/2)–1 so as to generate one normal phase clock pulse DCP(n/2) and one inverse phase clock pulse DCPN(n/2). These two clock pulses are outputted to the outside. Under this condition, the delays by the delaying device are all same. Further, the phase difference P between the normal phase clock pulse output DCPr of an arbitrary stage 30r and the normal phase clock output of the next stage [or the phase difference between an arbitrary inverse phase clock pulse output DCPNr and the inverse phase clock pulse DCPN(r–1) of the next stage] is equal to or larger than $T/(n-1)$.

That is, by satisfying the phase difference condition $P \geq T/(n-1)$, the normal phase clock pulse which is delayed sequentially with a certain phase difference is capable of detecting all the data edges which occur between the rising edge and the falling edge of the clock pulse. Further, the inverse phase clock pulse which is delayed sequentially with a certain phase difference is capable of detecting all the data edges which occur between the rising edge and the falling edge of the clock pulse.

Figure 4:
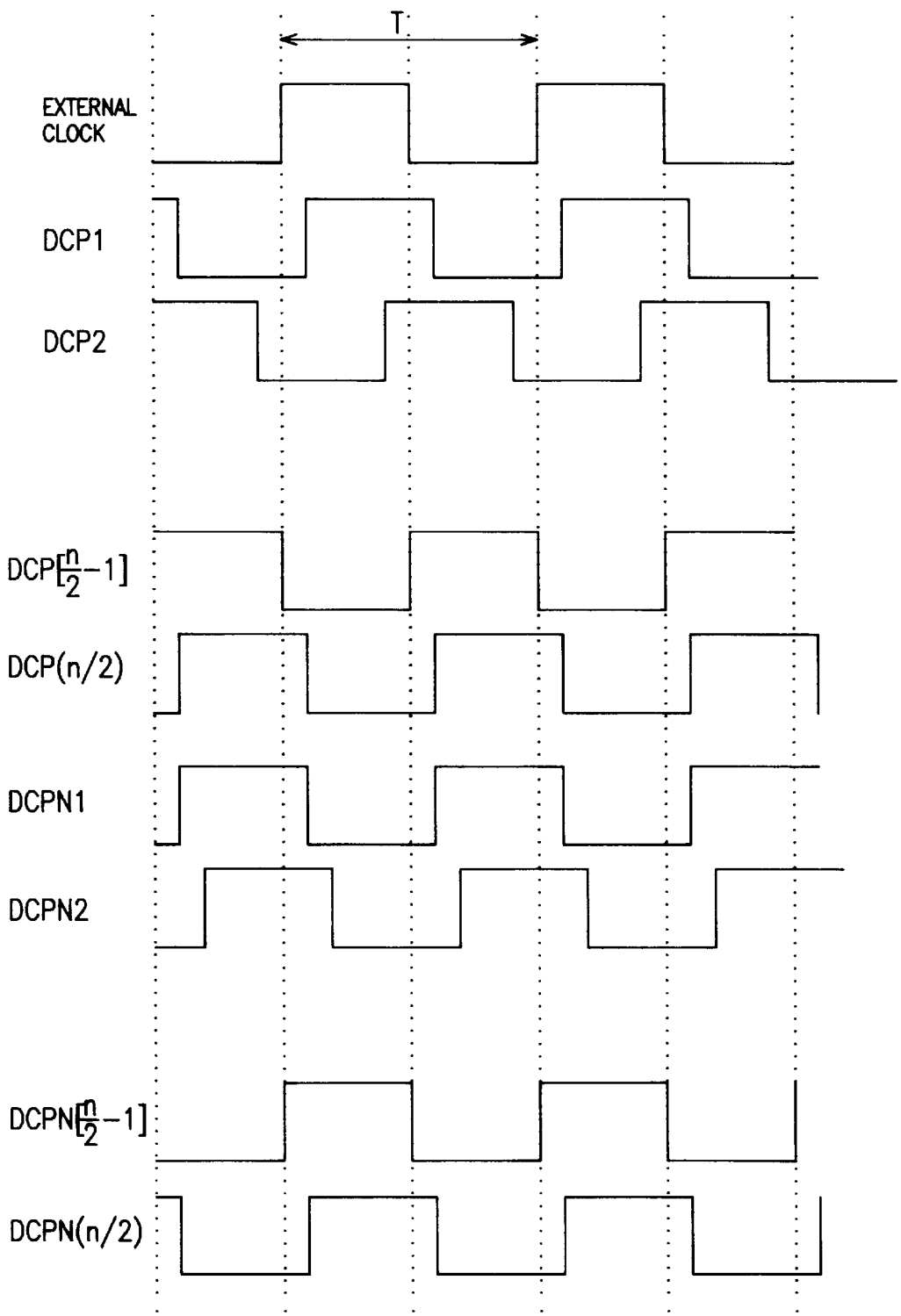
FIG. 4 illustrates major timings of the multiphase clock pulse generating section according to the present invention.

FIG. 4 illustrates major timings of the multiphase clock pulse generating section according to the present invention. In this drawing, reference codes DCP1, DCP2, . . ., DCP[

(n/2)−2], DCP[(n/2)−1] and DCP(n/2) indicate normal multi-phase clock pulse, while reference codes DCPN1, DCPN2, ..., DCPN[(n/2)−2], DCPN[(n/2)−1] and DCPN (n/2) indicate inverse multi-phase clock pulse.

The normal phase clock pulse DCP1 is a signal which is obtained by delaying an external clock pulse by a delaying device and two inverters in such a manner that the delayed clock pulse should have a phase difference of P relative to the externally inputted clock pulse.

The normal phase clock pulse DCP2 is a signal which is obtained by delaying the normal phase clock pulse DCP1 by a delaying device and two inverters in such a manner that the delayed clock pulse should have a phase difference of P relative to the normal phase clock pulse DCP1 of the preceding stage.

That is, an arbitrary clock pulse DCPr is a signal which is obtained by delaying the normal phase clock pulse DCP(r−1) by a delaying device and two inverters in such a manner that the delayed clock pulse should have a phase difference of P relative to the normal phase clock pulse DCP(r−1) of the preceding stage.

The normal phase clock pulse DCP(n/2) is a signal which is obtained by delaying the normal phase clock pulse DCP1 by a delaying device and two inverters in such a manner that the delayed clock pulse should have a phase difference of P. The phase difference from DCP1 to DCP(n/2) is larger than the half period (T/2) of the externally inputted clock pulse. Therefore, the normal multi-phase clock pulse from DCP1 to DCP(n/2) can detect the edges, no matter where the rising edges of the input data occur between the rising and falling edges of the inputted clocks.

The inverse phase clock pulse DCPN1 is a signal which is obtained by delaying the externally inputted clock pulse by a delaying device and an inverter in such a manner that the delayed clock pulse should have a phase difference of P.

The inverse phase clock pulse DCPN2 is a signal which is obtained by delaying the inverse phase clock pulse DCPN1 by a delaying device and two inverters in such a manner that the delayed clock pulse should have a phase difference of P.

That is, an arbitrary clock pulse DCPNr (except r=1) is a signal which is obtained by delaying the inverse phase clock pulse DCPN(r−1) by a delaying device and two inverters with a phase difference of P.

DCPN(n/2) is a signal which is obtained by delaying the DCPN(n/2)−1) by a delaying device and two inverters with a phase difference of P. The phase difference from DCPN1 to DCPN(n/2) is larger than the half period (T/2) of the externally inputted clock pulse. Therefore, the inverse multi-phase clock pulse from DCPN1 to DCPN(n/2) can detect the rising edges of the inputted data, no matter where the rising edges of the input data occur between the rising and falling edges of the inputted clocks.

Figure 5:
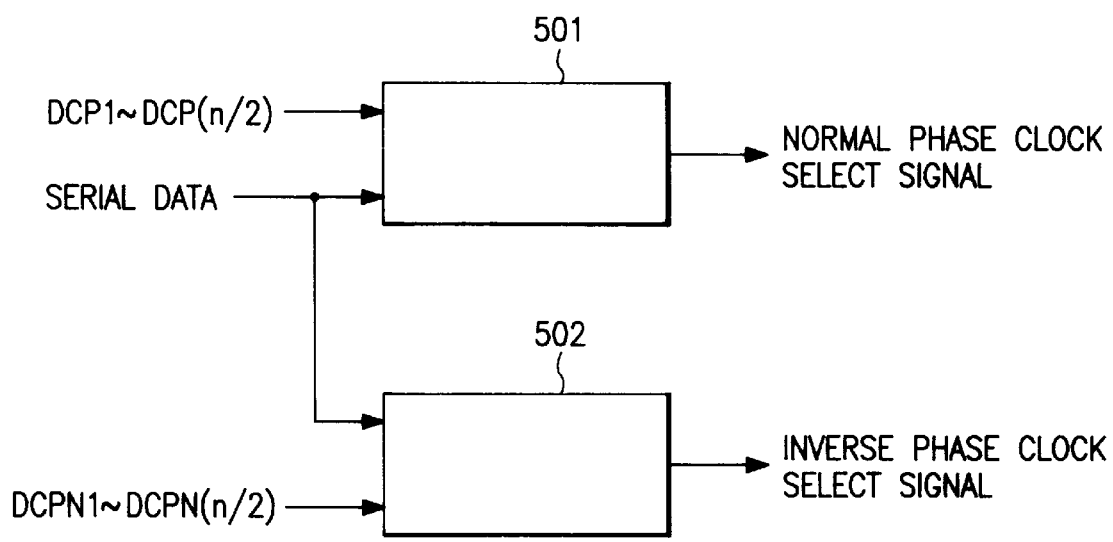
FIG. 5 illustrates an embodiment of the clock pulse select signal generating section according to the present invention.

FIG. 5 illustrates a block diagram showing an embodiment of the clock pulse select signal generating section according to the present invention. Reference code 501 indicates a normal phase clock pulse select signal generating section, and 502 indicates an inverse phase clock pulse select signal generating section.

As shown in the drawing, the normal phase clock pulse select signal generating section 501 receives the normal multi-phase clocks DCP1–DCP(n/2) and externally inputted data so as to output a control signal for selecting a clock pulse in which the edge occurs near the center of the unit interval of the externally inputted data, from among the n/2 normal multi-phase clock pulse (the above mentioned edge is the rising edge when retiming with the rising edge of the clock pulse, while it is the falling edge when retiming with the falling edge of the clock pulse).

The inverse phase clock pulse select signal generating section 502 receives the inverse multi-phase clocks DCPN1–DCPN(n/2) and externally inputted data so as to output a control signal for selecting one or more clock pulse in which the edge occurs near the center of the unit interval of the externally inputted data, from among the n/2 inverse multi-phase clock pulse (the above mentioned edge is the rising edge when retiming with the rising edge of the clock pulse, while it is the falling edge when retiming with the falling edge of the clock pulse).

Figure 6:
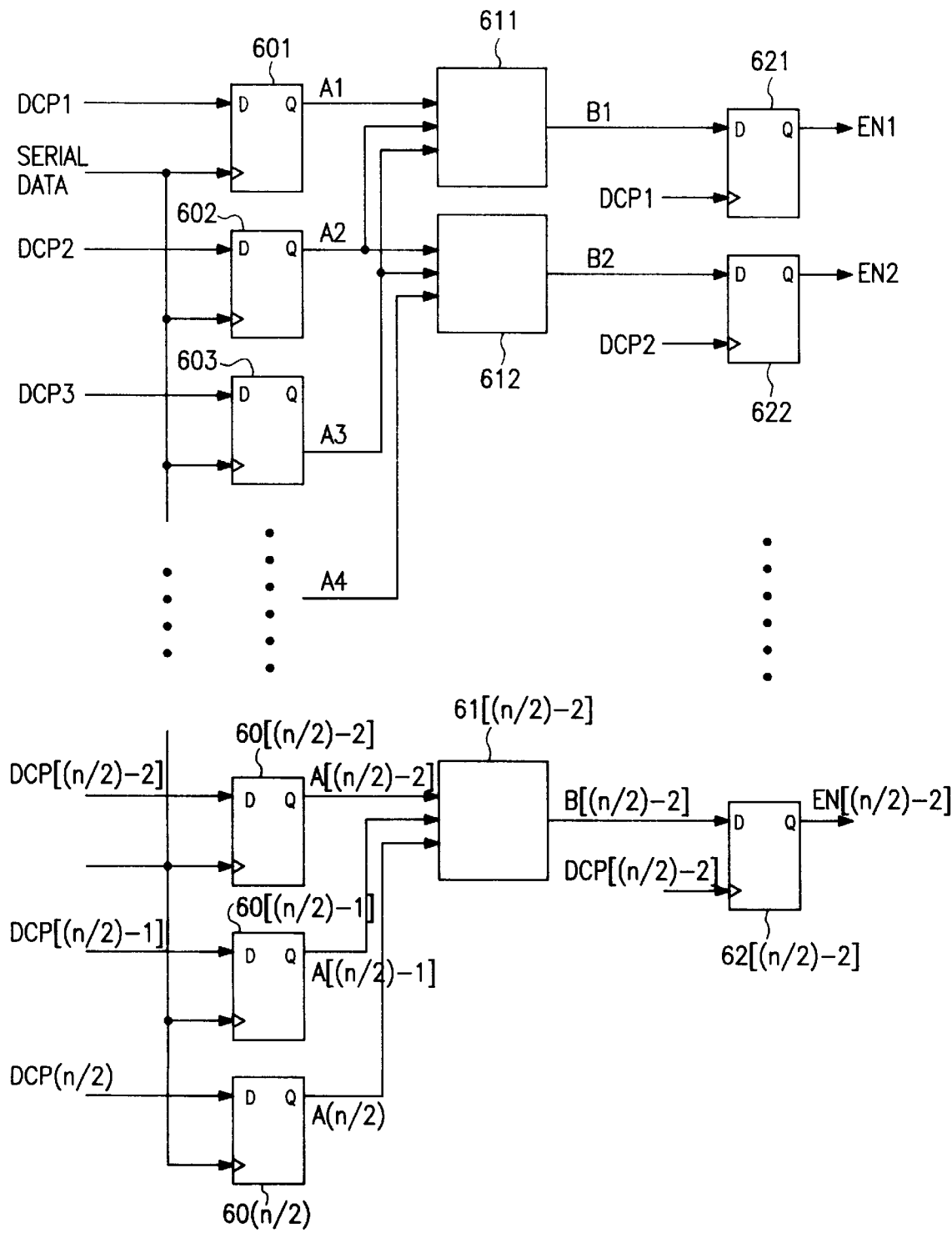
FIG. 6 illustrates an example of the clock pulse select signal generating section according to the present invention.

FIG. 6 illustrates an example of the clock pulse select signal generating section according to the present invention. This is commonly used on the normal phase clock pulse select signal generating section 501 and to the inverse phase clock pulse select signal generating section 502 of FIG. 5. Reference codes 601, 602, 603, ..., 60[(n/2)−2], 60[(n/2)−1] and 60(n/2), and 621, 622, ..., 62(n−2) indicate D flip flops. Further, reference codes 611, 612, ..., 6(n−2) indicate clock pulse select signal generating circuits.

The D flip flops 601, 602, 603, ..., 60[(n/2)−2], 60[(n/2)−1] and 60(n/2) respectively receive the normal multi-phase clock pulse DCP1, DCP2, ..., DCP[(n/2)−2], DCP[(n/2)−1] and DCP(n/2), and inverse multi-phase clock pulse DCPN1, DCPN2, ..., DCPN[(n/2)−2], DCPN[(n/2)−1] and DCPN(n/2), so as to retime the externally inputted data by utilizing the clock pulse, the outputs being {A1, A2, A3, ..., A[(n/2)−2], A[(n/2)−1], and A(n/2)}.

The clock pulse select signal generating circuits 611, 612, ..., 61(n−2) respectively receive the retimed output values A1, A2, A3, ..., A[(n/2)−2], A[(n/2)−1], and A(n/2)} of the D flip flops 601, 602, 603, ..., 60[(n/2)−2], 60[(n/2)−1] and 60(n/2). Then when an edge of the externally inputted data is detected, "0" is outputted, while when no edge is detected, "1" is outputted {B1, B2, ..., B[(n/2)−2]}.

Figure 7:
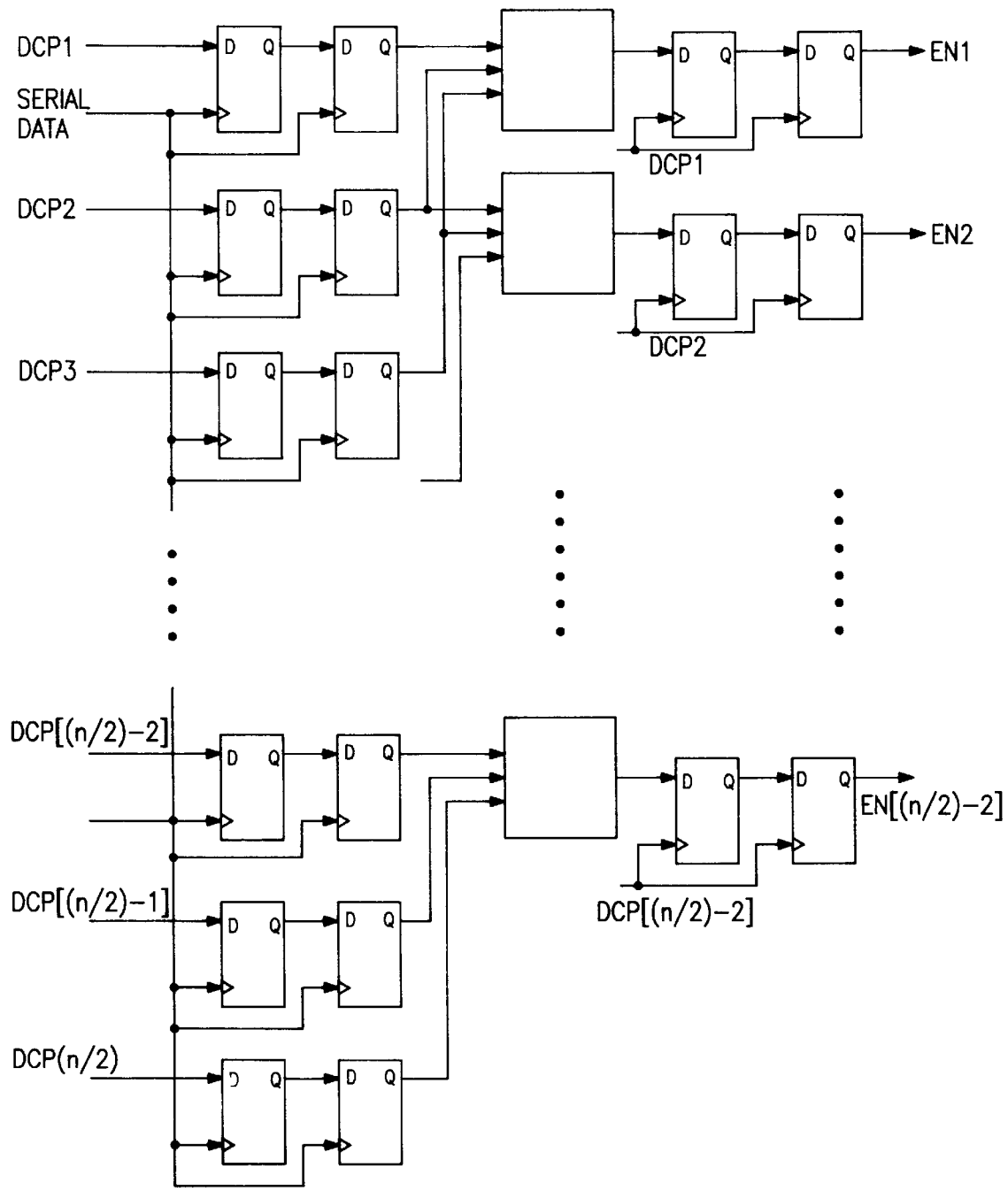
FIG. 7 illustrates an embodiment of a multi-step flip flop of the clock pulse select signal generating section according to the present invention.

The D flip flops 621, 622, 623, ..., 62[(n/2)−2] retimes the edge detection signals {B1, B2, ..., B[(n/2)−2]} of the clock pulse select signal generating circuits by utilizing the normal phase clock pulse [DCP1, DCP2,. DCP[(n/2)−2], DCP[(n/2)−1) and DCP(n/2)] and the inverse phase clock pulse [DCPN1, DCPN2,. . ., DCPN[(n/2)−2], DCPN[(n/2)−1) and DCPN(n/2)], their outputs being {EN1, EN2, ..., EN[(n/2)−2]}. Under this condition, the D flip flops 601, 602, 603, ..., 60[(n/2)−2], 60[(n/2)−1] and 60(n/2) and 621, 622, 623, ..., 62[(n/2)−2] can be used in two stages of FIG. 7 or multi-stages so as to reduce the probability of occurrence of a metastability.

Figure 8:
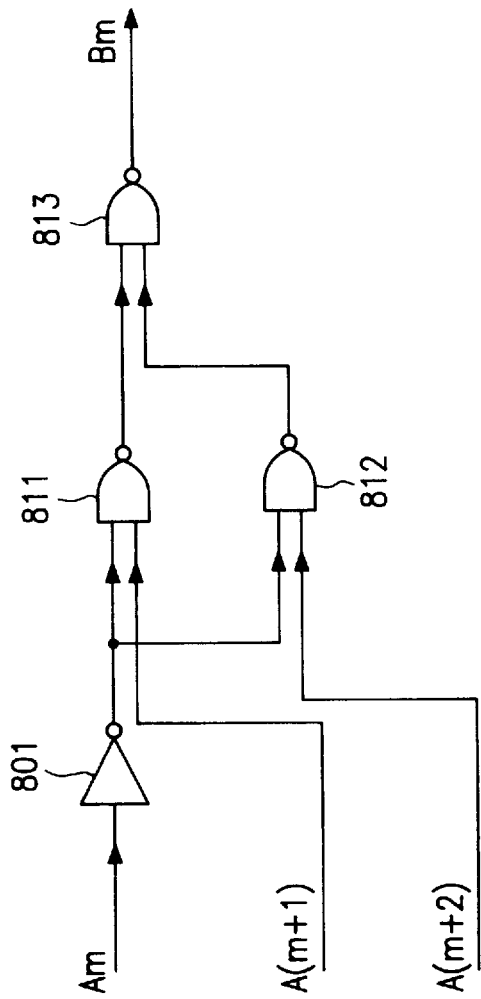
FIG. 8 illustrates an embodiment of the clock pulse select signal generating circuit according to the present invention.

FIG. 8 illustrates an embodiment of the clock pulse select signal generating circuit according to the present invention. Reference code 811 indicates an inverter, and reference codes 812, 813 and 814 indicate NOR gates.

In the drawing, reference codes Am, A(m+1) and A(m+2) (where m is a natural number equal to or smaller than n) respectively indicate mth, (m+1)th and (m+2)th output values among the retimed output values {A1, A2, A3, ..., A[(n/2−2], A[(n/2)−1] and A(n/2)} of the D flip flops 601, 602, 603, ..., 60[(n/2)−2], 60[(n/2)−1] and 60(n/2). If the logic values are different between Am and A(m+1) and between Am and A(m+2), the Bm value is a logic"0", and otherwise, Bm is a logic "1".

In the clock pulse select signal circuit section, the inputs [DCP1, DCP2,..., DCP(n/2)] into the D flip flops 601, 602, 603, ..., 60[(n/2−2], 60(n/2)−1] and 60(n/2) cannot satisfy the setup time or the hold time relative to the rising (or falling) edge of the externally inputted data. Consequently, a metastability condition occurs, and therefore, in the case where the output is a logic "1" or "0", or even if oscillations are carried out, if the pulse width is smaller than the delayed time of the inverter 801 or the NOR gates 811, 812 and 813, then the system operates in a stable manner. Therefore, the instability probability of the system due to the metastability can be significantly reduced.

Figure 9A:
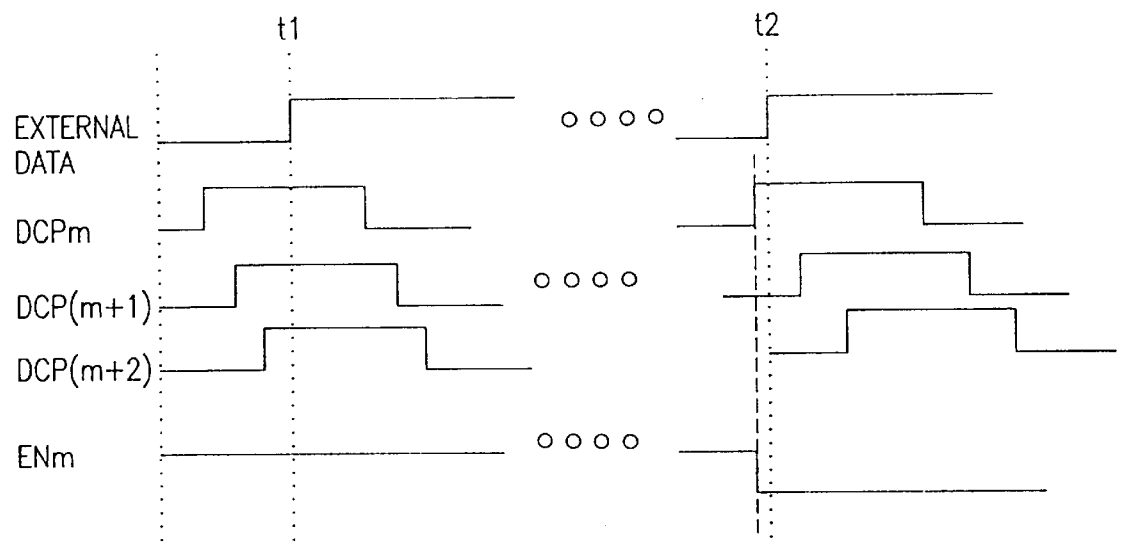
FIG. 9 illustrates a timing chart showing major timings of the clock pulse select signal generating circuit according to the present invention.
Figure 9B:
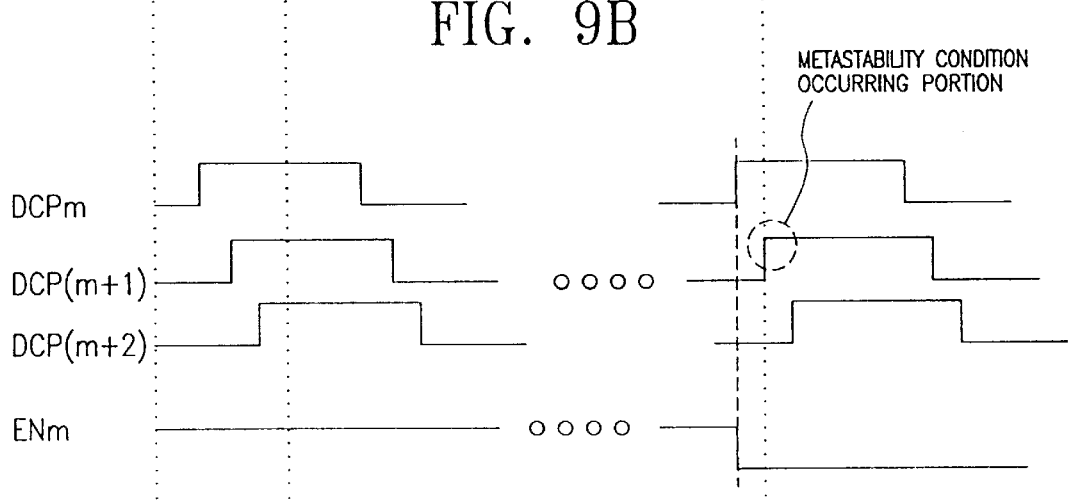

FIGS. 9A and 9B are timing charts showing the function of FIG. 6 for generating clock select signals in accordance with the phase of the inputted data. Reference codes DCPm, DCP(m+1) and DCP(m+2) (where m is a natural number smaller than n) indicate mth, (m+1)th and (m+2)th multi-phase clocks outputted from the multi-phase clock generating section. Reference code ENm indicates an mth clock select signal which is generated when a data edge is detected by the clock select signal generating section.

In FIG. 9A, at an arbitrary time t1, the edge of the inputted data does not exist in the edge portions of DCPm, DCP(m+1) and DCP(m+2). However, at a time t2 when the phase of the inputted data is varied due to jitters or wanders, the rising edge of the inputted data is present between the rising edge of DCPm and the rising edge of DCP(m+1). Under this condition, when the inputted clock pulse DCPm, DCP(m+1) and DCP(m+2) are retimed by means of the rising edge of the data, a metastability condition does not appear in any one of them. Under this condition, the retimed values of DCPm and DCP(m+1) which are retimed by means of the rising edge of the inputted data become different from each other. Therefore, the fact that an edge occurs in this interval can be detected, and the result is retimed by means of DCPm.

In FIG. 9B, at an arbitrary time t1, the edge of the inputted data does not exist in the edge portions of DCPm, DCP(m+1) and DCP(m+2). However, at a time t2 when the phase of the inputted data is varied due to jitters or wanders, if the inputted clock pulse DCPm, DCP(m+1) and DCP(m+2) are retimed by means of the rising edge of the data, DCPm and DCP(m+2) are stably retimed, while DCP(m+1) remains in a metastability state. In this case also, the retimed results of the DCPm and DCP(m+2) are different from each other, and by utilizing this fact, an occurrence of an edge within the mentioned interval can be detected. The results are retimed by means of DCPm, and the output is ENm.

Figure 10:
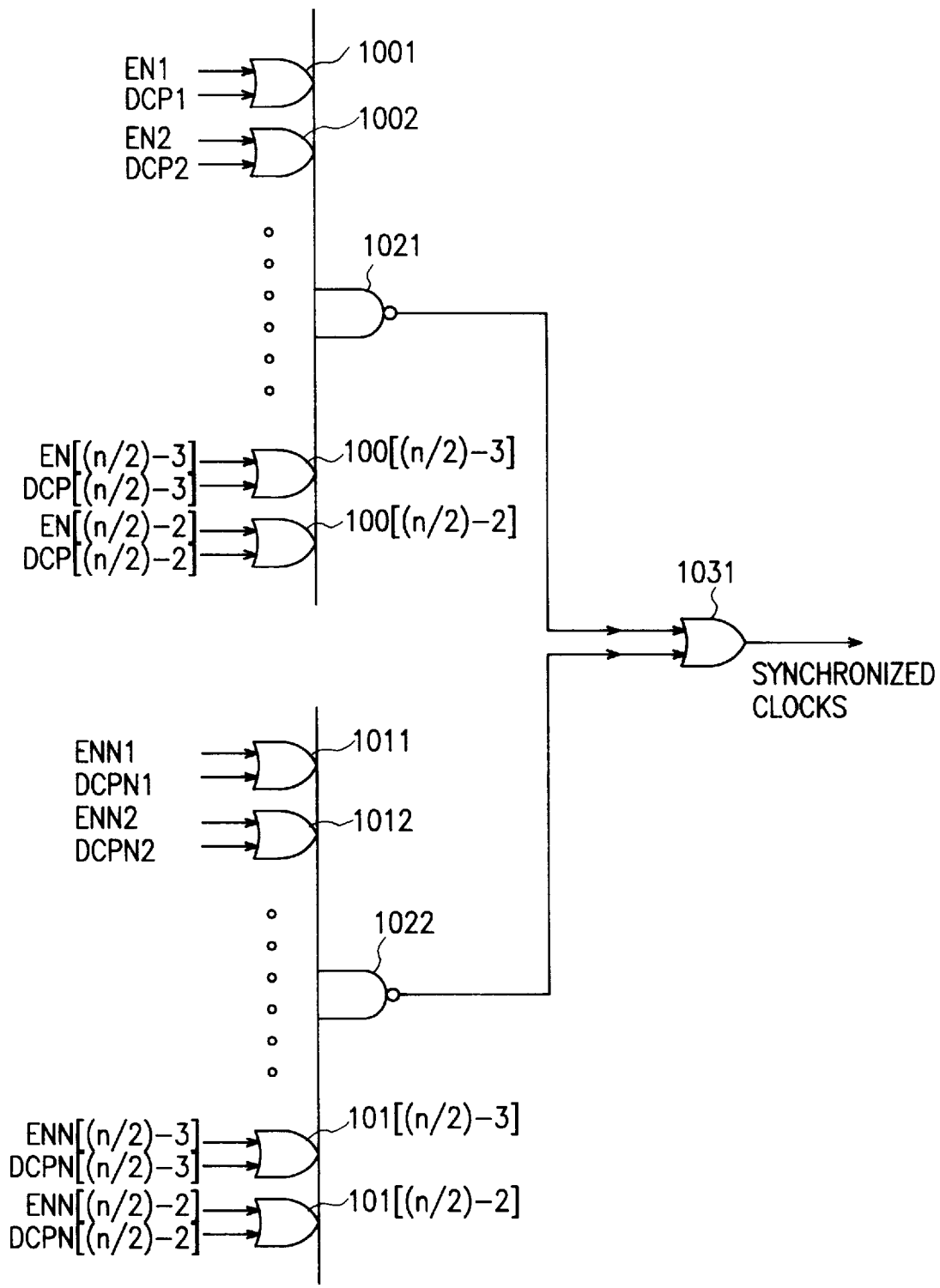
FIG. 10 illustrates an embodiment of the clock pulse synthesizing section according to the present invention.

FIG. 10 illustrates an embodiment of the clock pulse synthesizing section according to the present invention. Reference codes 1001, 1002, ..., 100[(n/2)-1] and 100(n/2), and 1011, 1012, ..., 101[(n/2)-1 and 101(n/2), and 1031 are 2-input OR gates, and reference codes 1021 and 1022 are (n/2)-input NAND gates.

As shown in the drawing, the normal multi-phase delaying clocks DCP1, DCP2, ..., DCP[(n/2)-3] and DCP[(n/2)-2] which are inputted from the multi-phase clock generating section are synthesized as follows. That is, in the case where they are selected by the selecting signals EN0, EN1,..., EN[(n/2)-3] and EN[(n/2)-2] through the OR gates 1001, 1002, ..., 100[(n/2)-1] and 100(n/2)] (that is, in the case where the logic selecting signal is "0"), they are bypassed so as to be synthesized with other clock pulse of another phase which have been bypassed by the NAND gate 1021. On the other hand, in the case where they are not selected (that is, in the case where the selecting logic signal is "1"), they are blocked so as to be outputted with logic "1".

The inverse multi-phase delaying clocks DCPN1, DCPN2,..., DCPN[(n/2)-3] and DCPN[(n/2)-2] which are inputted from the multi-phase clock generating section are synthesized as follows. That is, in the case where they are selected by the selecting signals ENN0, ENN1, ..., ENN[(n/2)-3] and ENN[(n/2)-2] through the OR gates 1011, 1012, ..., 101[(n/2)-1] and 101(n/2)) (that is, in the case where the logic selecting signal is "0"), they are bypassed so as to be synthesized with other clock pulse of another phase which have been bypassed by the NAND gate 921. On the other hand, in the case where they are not selected (that is, in the case where the selecting logic signal is "1"), they are blocked so as to be outputted with logic "1".

The 2-input OR gate 1031 finally synthesizes the normal phase synthesized clocks of the NAND gate 1021 with the inverse phase synthesized clocks of the NAND gate 1022 to output the synthesized result to the outside.

Figure 11:
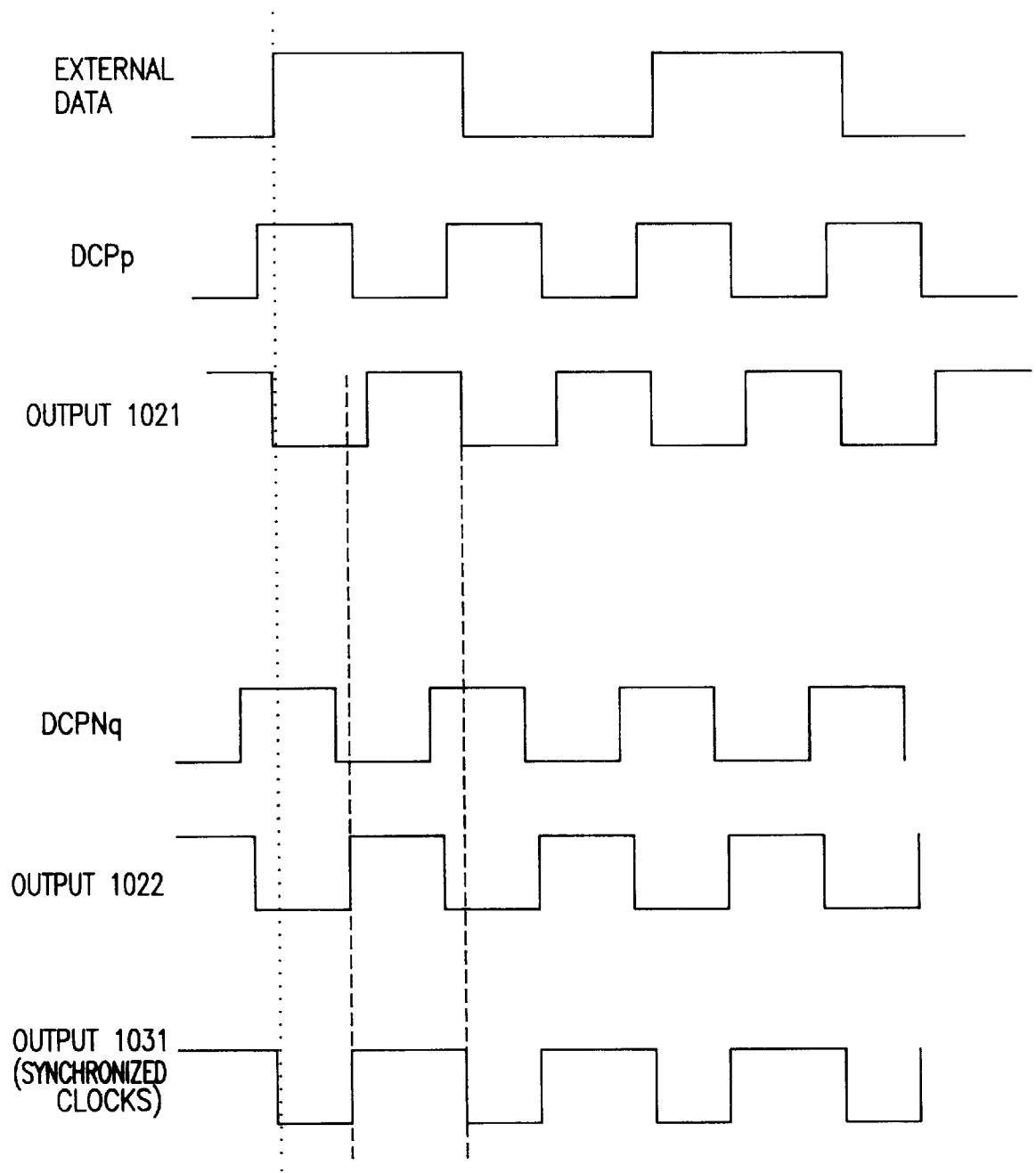
FIG. 11 is a timing chart showing major timings of the clock pulse synthesizing section according to the present invention.

FIG. 11 is a timing chart showing major timings of the clock pulse synthesizing section according to the present invention, for the case where a normal phase clock pulse DCPP [where p is a natural number smaller than (n/2)2] and an inverse phase clock pulse DCPq [where q is a natural number smaller than (n/2)-2] are selected in FIG. 10.

As shown in the drawing, all the normal phase clocks other than the selected normal phase clock pulse DCPp have a logic "1", and therefore, they are blocked by the 2-input OR gates 1001, 1002, ..., 100[(n/2)-3] and 100[(n/2)-2]. Only DCPp is phase-inverted through the 2-input NAND gate 1021 so as to be outputted to an input terminal of the 2-input OR gate 1031.

All the inverse phase clocks other than the selected inverse phase clock pulse DCPq have a logic "1", and therefore, they are blocked by the 2-input OR gates 1011, 1012, ..., 101[(n/2)-3] and 101[(n/2)-2]. Only DCPq is phase-inverted through the 2-input NAND gate 1022 so as to be outputted to an input terminal of the 2-input OR gate 1031.

The 2-input OR gate 1031 finally synthesizes the clock pulse of the 2-input NAND gate 1021 and the 2-input NAND gate 1022 so as to output the synthesized result to the outside.

According to the present invention as described above, the apparatus can be used for retiming high speed digital data, and has the following advantages compared with the conventional apparatus.

First, periodical and regular external clock pulse is delayed by means of a delaying device, so that the system performance would become independent of the pattern of data. Second, even if the data phases show a continuous difference (wander) for more than a certain period of time, an elastic buffer absorbs it, and therefore, no data loss is generated, with the result that the system is not put to a disorder. Third, even in the case where a metastability state occurs, its occurrence probability can be significantly reduced by utilizing a logic, thereby making it possible to retime the data in a stable manner

What is claimed is:

1. A high speed digital data retiming apparatus, comprising:

a multi-phase clock pulse generator for generating n multi-phase clock pulses having n phases by utilizing externally inputted clock pulses wherein n is a natural number;

a retiming clock pulse select signal generator for receiving the multi-phase clock pulses from said multi-phase clock pulse generator, to generate control pulses for selecting one or more of the received n multi-phase clock pulses with edges thereof approaching a center of a unit interval of externally inputted data, from among the n multi-phase clock pulses;

a retiming clock pulse synthesizer for receiving the multi-phase clock pulses from said multi-phase clock pulse generator and said control signals from said retiming clock pulse select signal generator, to synthesize retiming clock pulses so as to form edges of the retiming clock pulses at the center of the unit interval of the externally inputted data; and a data retimer for receiving the synthesized retiming clock pulses from said retiming clock pulse synthesizer to retime the externally inputted data;

wherein said multi-phase clock pulse generator comprises one or more clock generating unit modules for generating normal phase clock pulses and inverse phase clock pulses;

wherein said clock generating unit module comprises:
 a delaying section for receiving the externally inputted clock pulses or normal phase clock pulses of a preceding stage to delay them for a certain period of time,
 a first inverter for inverting an input of said delaying section to generate the inverse phase clock pulses; and
 a second inverter for inverting an output of said first inverter again to generate the normal phase clock pulses, wherein further positive phase clock generators of second and subsequent stages receive normal phase clock pulses from said positive phase clock generating module of a preceding stage to delay the normal phase clock pulses through a delaying device and to form normal phase clock pulses and inverse clock pulses through two inverters, so as to receive a next stage clock input, thereby forming a multi-stage construction; and wherein said retiming clock pulse select signal generator comprises:
 a normal phase clock pulse select signal generating section for receiving the normal phase clock pulses generated by said clock generating unit modules and the externally inputted data so as to output the control signals for selecting one or more of the received normal phase clock pulses with edges thereof approaching the center of a unit interval of the externally inputted data, from among n/2 normal phase clock pulses, and
 an inverse phase clock pulse select signal generating section for receiving inverse multi-phase clock pulses generated by said clock generating unit modules and the externally inputted data so as to output the control signals for selecting one or more of the received inverse phase clock pulses with their edges approaching the center of the unit interval of the externally inputted data, from among the n/2 inverse phase clock pulses.

* * * * *